US012588040B2

(12) United States Patent
Xing et al.

(10) Patent No.: US 12,588,040 B2
(45) Date of Patent: Mar. 24, 2026

(54) FEEDBACK CHANNEL ALLOCATION AND TRANSMISSION METHOD AND DEVICE

(71) Applicant: ZTE CORPORATION, Shenzhen (CN)

(72) Inventors: Weimin Xing, Shenzhen (CN); Boyuan Zhang, Shenzhen (CN); Youxiong Lu, Shenzhen (CN); Jin Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 420 days.

(21) Appl. No.: 17/591,661

(22) Filed: Feb. 3, 2022

(65) Prior Publication Data

US 2022/0264531 A1 Aug. 18, 2022

Related U.S. Application Data

(63) Continuation of application No. PCT/CN2019/099786, filed on Aug. 8, 2019.

(51) Int. Cl.
*H04W 72/40* (2023.01)
*H04L 1/1812* (2023.01)
(Continued)

(52) U.S. Cl.
CPC ........... *H04W 72/40* (2023.01); *H04L 1/1812* (2013.01); *H04L 5/0055* (2013.01); *H04W 72/02* (2013.01);
(Continued)

(58) Field of Classification Search
CPC . H04L 1/18–1896; H04L 5/0053–0055; H04L 1/1861; H04L 1/1812;
(Continued)

(56) References Cited

U.S. PATENT DOCUMENTS

| | | | | |
|---|---|---|---|---|
| 10,425,915 B2 * | 9/2019 | Sheng | ................. | H04W 72/02 |
| 10,785,753 B1 * | 9/2020 | Li | ......................... | H04L 5/0044 |

(Continued)

FOREIGN PATENT DOCUMENTS

| | | |
|---|---|---|
| CN | 105813204 A | 7/2016 |
| CN | 106793092 A | 5/2017 |

(Continued)

OTHER PUBLICATIONS

CMCC "Discussion on HARQ feedback and CSI acquisition for sidelink"; 3GPP TSG RAN WG I Meeting #95, Nov. 12-16, 2018; 5 Pages; RI-1812879; Spokane, USA.

(Continued)

*Primary Examiner* — Brendan Y Higa
(74) *Attorney, Agent, or Firm* — Foley & Lardner LLP

(57) ABSTRACT

A system and method for configuring feedback channel allocation and transmission during sidelink communication are disclosed herein. In one embodiment, an example wireless communication method includes: configuring, by a wireless communication node, a plurality of resource pools for sidelink communications. The method further includes configuring, by the wireless communication node, a first list indicating a first subset of the plurality of resource pools and a second list indicating a second subset of the plurality of resource pools. Each of the plurality of resource pools includes at least one of a first type of resources that are each configured for a plurality of wireless communication devices to communicate control information in the sidelink communications, a second type of resources that are each configured for the plurality of wireless communication devices to communicate data in the sidelink communications, and a third type of resources that are each configured for the plurality of wireless communication devices to communicate feedback in the sidelink communications.

17 Claims, 6 Drawing Sheets

(51) Int. Cl.

| | |
|---|---|
| *H04L 5/00* | (2006.01) |
| *H04W 72/02* | (2009.01) |
| *H04W 72/04* | (2023.01) |
| *H04W 72/0446* | (2023.01) |
| *H04W 72/0453* | (2023.01) |
| *H04W 72/20* | (2023.01) |
| *H04W 72/25* | (2023.01) |
| *H04W 76/14* | (2018.01) |

(52) U.S. Cl.
CPC ....... *H04W 72/04* (2013.01); *H04W 72/0446* (2013.01); *H04W 72/0453* (2013.01); *H04W 72/20* (2023.01); *H04W 72/25* (2023.01); *H04W 76/14* (2018.02)

(58) Field of Classification Search
CPC .... H04L 5/0055; H04W 72/20; H04W 72/25; H04W 72/04–115; H04W 72/40; H04W 76/14; H04W 72/12; H04W 72/50; H04W 76/23
See application file for complete search history.

(56) References Cited

U.S. PATENT DOCUMENTS

| | | | | |
|---|---|---|---|---|
| 11,316,622 | B2 * | 4/2022 | Kung | H04L 1/1812 |
| 11,382,083 | B2 * | 7/2022 | Guo | H04W 88/023 |
| 11,444,729 | B2 * | 9/2022 | Yeo | H04L 1/1854 |
| 11,457,455 | B2 * | 9/2022 | Taherzadeh Boroujeni | H04W 72/02 |
| 12,063,627 | B2 * | 8/2024 | Wang | H04W 28/26 |
| 12,426,070 | B2 * | 9/2025 | Hong | H04L 5/0005 |
| 2016/0295624 | A1 | 10/2016 | Novlan et al. | |
| 2017/0041902 | A1 * | 2/2017 | Sheng | H04W 72/02 |
| 2018/0069664 | A1 * | 3/2018 | Khoryaev | H04L 1/1621 |
| 2018/0092067 | A1 | 3/2018 | Liu et al. | |
| 2019/0052436 | A1 * | 2/2019 | Desai | H04L 1/18 |
| 2020/0029318 | A1 * | 1/2020 | Guo | H04L 5/0055 |
| 2020/0037343 | A1 * | 1/2020 | He | H04W 72/20 |
| 2020/0099479 | A1 * | 3/2020 | Park | H04W 4/70 |
| 2020/0153574 | A1 * | 5/2020 | Shin | H04W 4/40 |
| 2020/0170002 | A1 * | 5/2020 | Lee | H04W 72/0453 |
| 2020/0178217 | A1 * | 6/2020 | Huang | H04W 76/27 |
| 2020/0187252 | A1 * | 6/2020 | Lee | H04W 4/40 |
| 2020/0220669 | A1 * | 7/2020 | Park | H04L 1/1861 |
| 2020/0313804 | A1 * | 10/2020 | Ryu | H04W 72/20 |
| 2020/0322099 | A1 * | 10/2020 | Park | H04W 72/20 |
| 2020/0351033 | A1 * | 11/2020 | Ryu | H04L 1/1861 |
| 2020/0351866 | A1 * | 11/2020 | Park | H04L 1/1864 |
| 2020/0403737 | A1 * | 12/2020 | Yeo | H04W 52/367 |
| 2021/0014831 | A1 * | 1/2021 | Ryu | H04L 5/0092 |
| 2021/0051629 | A1 * | 2/2021 | Manolakos | H04W 72/0453 |
| 2021/0203453 | A1 * | 7/2021 | Kim | H04L 5/0055 |
| 2021/0329431 | A1 * | 10/2021 | Su | H04L 5/0094 |
| 2021/0337544 | A1 * | 10/2021 | Wang | H04W 4/06 |
| 2021/0391951 | A1 * | 12/2021 | Lee | H04W 4/08 |
| 2021/0400636 | A1 * | 12/2021 | Seo | H04L 5/0055 |
| 2021/0400681 | A1 * | 12/2021 | Wang | H04L 5/0053 |
| 2022/0007335 | A1 * | 1/2022 | Feng | H04W 72/0453 |
| 2022/0045798 | A1 * | 2/2022 | Tang | H04W 4/40 |
| 2022/0053462 | A1 * | 2/2022 | Wang | H04W 72/044 |
| 2022/0086807 | A1 * | 3/2022 | Dong | H04W 72/20 |
| 2022/0124726 | A1 * | 4/2022 | Zhao | H04W 72/542 |
| 2022/0131647 | A1 * | 4/2022 | Hwang | H04L 1/1812 |
| 2022/0174647 | A1 * | 6/2022 | Lee | H04W 72/20 |
| 2022/0256535 | A1 * | 8/2022 | Horiuchi | H04L 5/0033 |
| 2022/0393807 | A1 * | 12/2022 | Xue | H04W 72/23 |
| 2023/0354272 | A1 * | 11/2023 | Elshafie | H04W 72/04 |
| 2024/0098763 | A1 * | 3/2024 | Hosseini | H04L 5/0044 |
| 2024/0172247 | A1 * | 5/2024 | Panzner | H04W 72/232 |

FOREIGN PATENT DOCUMENTS

| | | | | |
|---|---|---|---|---|
| CN | 107251641 A | 10/2017 | | |
| CN | 107439036 A | 12/2017 | | |
| CN | 108282881 A | 7/2018 | | |
| CN | 109644433 A | 4/2019 | | |
| CN | 109644455 A | 4/2019 | | |
| CN | 109891981 A | 6/2019 | | |
| EP | 3 242 515 A1 | 11/2017 | | |
| KR | 102808908 B1 * | 5/2025 | | H04W 72/04 |
| WO | WO-2016/107244 A1 | 7/2016 | | |
| WO | WO-2018/084796 A1 | 5/2018 | | |
| WO | WO-2018/171540 A1 | 9/2018 | | |
| WO | WO-2018/201784 A1 | 11/2018 | | |
| WO | WO-2019/028846 A1 | 2/2019 | | |
| WO | WO-2019/127048 A1 | 7/2019 | | |
| WO | WO-2019160788 A1 * | 8/2019 | | H04W 72/56 |
| WO | WO-2020259329 A1 * | 12/2020 | | H04W 72/02 |

OTHER PUBLICATIONS

CMCC "Discussion on resource allocation mechanism for NR V2X"; 3GPP TSG RAN WGI Meeting #95; Nov. 12-16, 2018; 4 Pages; RI-1812880; Spokane, USA.

International Search Report and Written Opinion for PCT Appl. No. PCT/CN2019/099786 mailed May 7, 2020.

LG Electronics, "Feature lead summary for agenda item 7.2.4.5 Physical layer procedures for sidelink" 3GPP TSG RAN WG1 #97, R1-1907682, May 17, 2019, Reno, USA (26 pages).

Extended European Search Report for EP Appl. No. 19940522.6, dated Jan. 16, 2023 (11 pages).

First Examination Report on AU Appl. No. 2019460048, dated Jan. 19, 2023 (3 pages).

Samsung, "On Sidelink HARQ Procedure", 3GPP TSG RAN WG1 #97, R1-1906948, May 17, 2019, Reno, USA (11 pages).

Vivo, "Tx and Rx resource pool definition for NR V2X sidelink" 3GPP TSG-RAN WG2 Meeting #106, R2-1905848, May 17, 2019, Reno, USA (3 pages).

CMCC, "Discussion on HARQ feedback and CSI acquisition for sidelink", 3GPP TSG RAN WG1 Meeting #95, R1-1812879, Nov. 16, 2018, Spokan, USA (5 pages).

CMCC, "Discussion on resource allocation mechanism for NR V2X", 3GPP TSG RAN WG1 Meeting #95, R1-1812880, Nov. 16, 2018, Spokane, USA (4 pages).

Written Opinion for SG Appl. No. 11202201172V, dated Aug. 14, 2024 (8 pages).

First Office Action for CN Appl. No. 201980099007.4, dated May 28, 2024 (with English translation, 20 pages).

Second Office Action for CN App. No. 2019800990074 dated Oct. 24, 2024 (with English translation, 17 pages).

ZTE, et al., "NR sidelink physical layer structure," 3GPP TSG RAN WG1 #96bis; R1-1904814; Xi'an, China; Apr. 8-12, 2019 (9 pages).

Third Office Action for CN Appl. No. 201980099007.4, dated Jan. 14, 2025 (with English translation, 19 pages).

Rejection Decision on CN App. No. 201980099007.4 dated Apr. 16, 2025 (with English translation, 17 pages).

ZTE, et al. "NR sidelink physical layer structure," 3GPP TSG RAN WG1 #97; R1-1906457; Reno, USA; May 13-17, 2019 (12 pages).

Final Rejection for KR Appl. No. 10-2022-7007707, dated Jul. 8, 2025 (with English translation, 5 pages).

\* cited by examiner

400

410 resource pool
list resource pool 1    412 resource pool 2    414 resource pool N    416

Data resource pool
configuration:
1) time-frequency
configuration
2)TX/RX expe (TX, TX, or
both)
3) TX/RX parameters Feedback resource pool
configuration:
1) time-frequency
configuration
2) TX/RX parameters Control resource pool
configuration:
1) time-frequency
configuration
2) TX/RX parameters

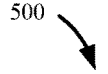

500

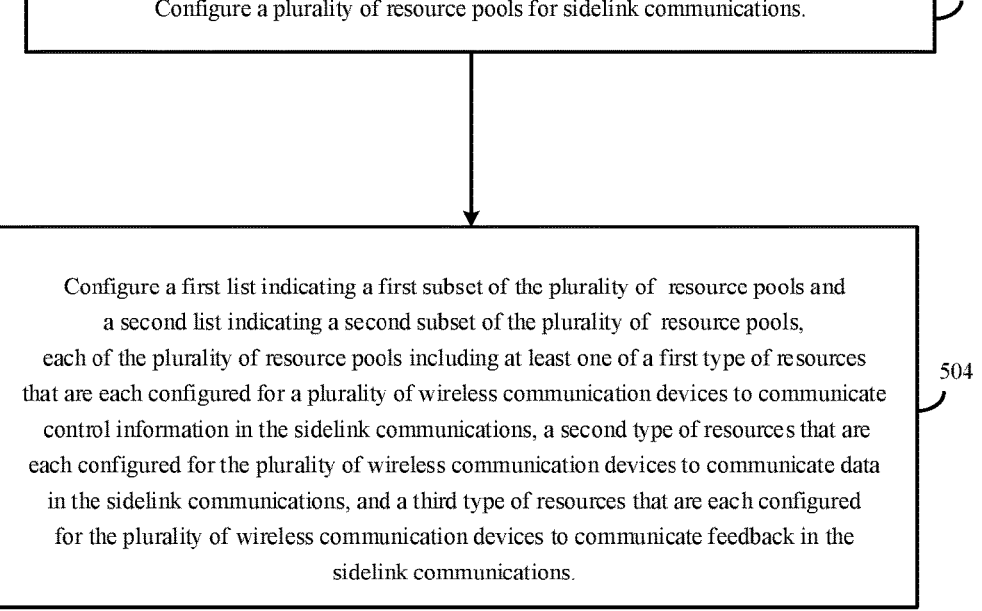

Configure a plurality of resource pools for sidelink communications.

502

Configure a first list indicating a first subset of the plurality of resource pools and a second list indicating a second subset of the plurality of resource pools, each of the plurality of resource pools including at least one of a first type of resources that are each configured for a plurality of wireless communication devices to communicate control information in the sidelink communications, a second type of resources that are each configured for the plurality of wireless communication devices to communicate data in the sidelink communications, and a third type of resources that are each configured for the plurality of wireless communication devices to communicate feedback in the sidelink communications.

602

Receive a configuration of a plurality of resource pools for sidelink communications.

Receive a configuration of a first list and a second list, the first list indicating a first subset of the plurality of resource pools and the second list indicating a second subset of the plurality of resource pools, with each of the plurality of resource pools including at least one of a first type of resources that are each configured for the plurality of wireless communication devices to communicate control information in the sidelink communications, a second type of resources that are each configured for the plurality of wireless communication devices to communicate data in the sidelink communications, and a third type of resources that are each configured for the in the sidelink communications of wireless communication devices to communicate feedback in the sidelink communications.

FEEDBACK CHANNEL ALLOCATION AND TRANSMISSION METHOD AND DEVICE

CROSS-REFERENCE TO RELATED APPLICATION

This application claims the benefit of priority under 35 U.S.C. § 120 as a continuation of PCT Patent Application No. PCT/CN2019/099786, filed on Aug. 8, 2019, the disclosure of which is incorporated herein by reference in its entirety.

TECHNICAL FIELD

The disclosure relates generally to wireless communications and, more particularly, to systems and methods for feedback channel allocation and transmission using sidelink communication.

BACKGROUND

Sidelink (SL) communication is a wireless radio communication directly between two or more user equipment devices (hereinafter "UE"). In this type of communication, two or more UEs that are geographically proximate to each other can directly communicate without going through an Evolved Node B (eNB), or a next Generation Node B (gNB), or a base station (hereinafter "BS"), or a core network. Data transmission in sidelink communications is thus different from typical cellular network communications, which transmit data to a BS (i.e., uplink transmissions) or receive date from a BS (i.e., downlink transmissions). In sidelink communications, data is transmitted directly from a source UE to a target UE through the Unified Air Interface, e.g., PC5 interface, without passing through a BS.

In 3GGP technology, the allocation of SL communication resources is based on "resource pools", formed by: a "subframe pool" in time domain, including all subframes carrying the SL, and a "resource blocks pool" in frequency domain, the subset of resource blocks within the subframe pool that are actually assigned to the SL. Two types of resource pools are defined for transmission and reception: a Tx resource pool includes the candidate resources that may be used for UE's SL Tx, and a Rx resource pool includes the candidate resources that UE may use to detect/receive other UE's SL signal. UEs can support multiple resource pools interleaved in time domain. There is no support for a feedback channel for sidelink communication in the current 3 GPP standards.

There is a need to find a solution to the problem that current wireless communication standards do not support sending feedback information during sidelink communication. This is more so because of the demand for new services on the sidelink that require feedback information, for example, unicast and groupcast services.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments is made while remaining within the scope of this disclosure.

In one embodiment, an example wireless communication method includes: configuring, by a wireless communication node, a plurality of resource pools for sidelink communications. The method further includes configuring, by the wireless communication node, a first list indicating a first subset of the plurality of resource pools and a second list indicating a second subset of the plurality of resource pools. Each of the plurality of resource pools includes at least one of, a first type of resources that are each configured for a plurality of wireless communication devices to communicate control information in the sidelink communications, a second type of resources that are each configured for the plurality of wireless communication devices to communicate data in the sidelink communications, and a third type of resources that are each configured for the plurality of wireless communication devices to communicate feedback in the sidelink communications.

In another embodiment, a wireless communication method includes: receiving, by one of a plurality of wireless communication devices, configurations of a plurality of resource pools for sidelink communications. The method further includes receiving, by the wireless communication device, a first list and a second list, the first list indicating a first subset of the plurality of resource pools and the second list indicating a second subset of the plurality of resource pools. Each the plurality of resource pools includes at least one of a first type of resources that are each configured for the plurality of wireless communication devices to communicate control information in the sidelink communications, a second type of resources that are each configured for the plurality of wireless communication devices to communicate data in the sidelink communications, and a third type of resources that are each configured for the in the sidelink communications of wireless communication devices to communicate feedback in the sidelink communications.

The above and other aspects and their implementations are described in greater detail in the drawings, the descriptions, and the claims.

BRIEF DESCRIPTION OF THE DRAWINGS

Various example embodiments of the present disclosure are described in detail below with reference to the following figures or drawings. The drawings are provided for purposes of illustration only and merely depict example embodiments of the present disclosure to facilitate the reader's understanding of the present disclosure. Therefore, the drawings should not be considered limiting of the breadth, scope, or applicability of the present disclosure. It should be noted that for clarity and ease of illustration, these drawings are not necessarily drawn to scale.

FIG. 5 illustrates a method from the point of view of a wireless node, depicting the configuration of resource pools performed by the wireless node to enable sidelink communication between communication devices that support feedback information.

FIG. 6 depicts a method from the point of view of a wireless communication device, depicting the receiving of configuration of resource pools by the wireless device to enable sideline communication using the device that support feedback information.

DETAILED DESCRIPTION OF EXAMPLE EMBODIMENTS

Overview

Various example embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein is made without departing from the scope of the present disclosure. Thus, the present disclosure is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes is re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1A:
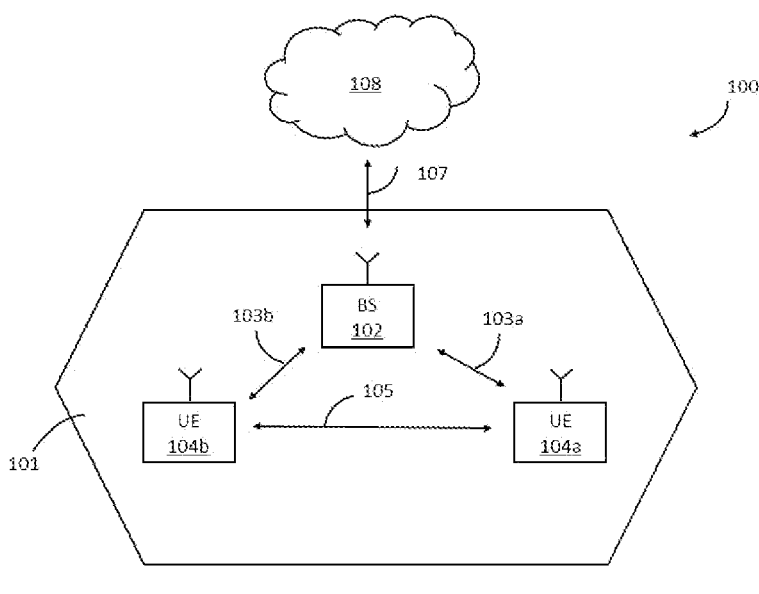
FIG. 1A illustrates an example cellular communication network in which techniques and other aspects disclosed herein may be implemented, in accordance with an embodiment of the present disclosure.

Referring to FIG. 1A, an example wireless communication network 100 is shown. The wireless communication network 100 illustrates a group communication within a cellular network. In a wireless communication system, a network side communication node or a base station (BS) can include a next Generation Node B (gNB), an E-utran Node B (also known as Evolved Node B, eNodeB or eNB), a pico station, a femto station, a Transmission/Reception Point (TRP), an Access Point (AP), or the like. A terminal side node or a user equipment (UE) can include a long range communication system such as, for example, a mobile device, a smart phone, a personal digital assistant (PDA), a tablet, a laptop computer, or a short range communication system such as, for example a wearable device, a vehicle with a vehicular communication system, or the like. In FIG. 1A, a network side and a terminal side communication node are represented by a BS 102 and a UE 104a or 104b, respectively, and in the embodiments in this disclosure hereafter. In some embodiments, the BS 102 and UE 104a/ 104b are sometimes referred to as "wireless communication node" and "wireless communication device," respectively.

Such communication nodes/devices can perform wireless and/or wired communications.

In the illustrated embodiment of FIG. 1A, the BS 102 can define a cell 101 in which the UEs 104a-b are located. The UE 104a can include a vehicle that is moving within a coverage of the cell 101. The UE 104a can communicate with the BS 102 via a communication channel 103a. Similarly, the UE 104b can communicate with the BS 102 via a communication channel 103b. In addition, the UEs 104a-b can communicate with each other via a communication channel 105. The communication channels (e.g., 103a-b) between the UE and the BS is through interfaces such as a Uu interface, which is also known as UMTS (Universal Mobile Telecommunication System (UMTS) air interface. The communication channels (e.g., 105) between the UEs is through a PC5 interface, which is introduced to address high moving speed and high density applications such as, for example, Vehicle-to-Vehicle (V2V) communications, Vehicle-to-Pedestrian (V2P) communications, Vehicle-to-Infrastructure (V2I) communications, Vehicle-to-Network (V2N) communications, or the like. In some instances, such car network communications modes is collective referred to as Vehicle-to-Everything (V2X) communications. It is appreciated that the communications channels between the UEs is used in Device-to-Device (D2D) communications while remaining within the scope of the present disclosure. The BS 102 is connected to a core network (CN) 108 through an external interface 107, e.g., an Iu interface.

Figure 1B:
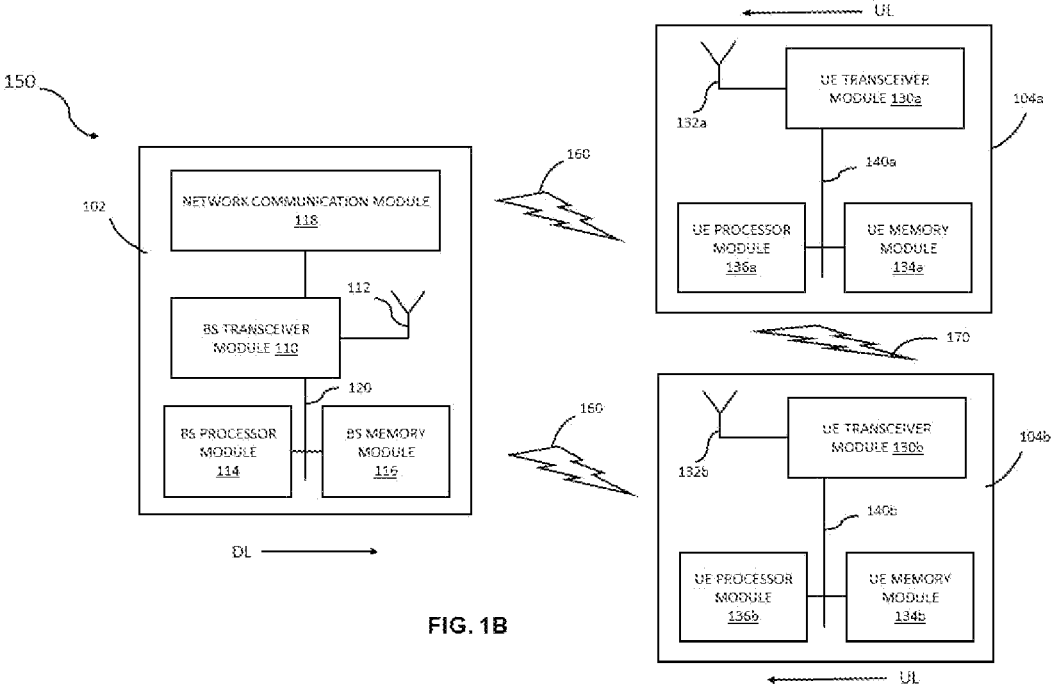
FIG. 1B illustrates a block diagram of an example wireless communication system for transmitting and receiving downlink, uplink and sidelink communication signals, in accordance with some embodiments of the present disclosure.

FIG. 1B illustrates a block diagram of an example wireless communication system 150 for transmitting and receiving downlink, uplink and sidelink communication signals, in accordance with some embodiments of the present disclosure. The system 150 may include components and elements configured to support known or conventional operating features that need not be described in detail herein. In one embodiment, the system 150 can transmit and receive data symbols in a wireless communication environment such as the wireless communication network 100 of FIG. 1A, as described above.

The system 150 generally includes the BS 102 and UEs 104a-b, as described in FIG. 1A. The BS 102 includes a BS transceiver module 110, a BS antenna 112, a BS memory module 116, a BS processor module 114, and a network communication module 118, each module being coupled and interconnected with one another as necessary via a data communication bus 120. The UE 104a includes a UE transceiver module 130a, a UE antenna 132a, a UE memory module 134a, and a UE processor module 136a, each module being coupled and interconnected with one another as necessary via a data communication bus 140a. Similarly, the UE 104b includes a UE transceiver module 130b, a UE antenna 132b, a UE memory module 134b, and a UE processor module 136b, each module being coupled and interconnected with one another as necessary via a data communication bus 140b. The BS 102 communicates with the UEs 104a-b via one or more of a communication channel 160, which is any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from an antenna of one of the UEs 104a-b to an antenna of the BS 102 is known as an uplink transmission, and a wireless transmission from an antenna of the BS 102 to an antenna of one of the UEs 104a-b is known as a downlink transmission. In accordance with some embodiments, each of the UE transceiver modules 130a-b may be referred to herein as an uplink transceiver, or UE transceiver. The uplink transceiver can include a transmitter and receiver circuitry that are each coupled to the respective antenna 132a-b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter and receiver circuitry that are each coupled to the antenna 112. A downlink duplex switch may alternatively couple the downlink transmitter or receiver to the antenna 112 in time duplex fashion. The operations of the transceivers 110 and 130a-b are coordinated in time such that the uplink receiver is coupled to the antenna 132a-b for reception of transmissions over the wireless communication channel 160 at the same time that the downlink transmitter is coupled to the antenna 112. In some embodiments, the UEs 104a-b can use the UE transceivers 130a-b through the respective antennas 132a-b to communicate with the BS 102 via the wireless communication channel 160. The wireless communication channel 160 is any wireless channel or other medium known in the art suitable for downlink (DL) and/or uplink (UL) transmission of data as described herein. The UEs 104a-b can communicate with each other via a wireless communication channel 170. The wireless communication channel 170 is any wireless channel or other medium known in the art suitable for sidelink transmission of data as described herein.

Each of the UE transceiver 130a-b and the BS transceiver 110 are configured to communicate via the wireless data communication channel 160, and cooperate with a suitably configured antenna arrangement that can support a particular wireless communication protocol and modulation scheme. In some embodiments, the UE transceiver 130a-b and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130a-b and the BS transceiver 110 may be configured to support alternate, or additional, wireless data communication protocols, including future standards or variations thereof.

The processor modules 136a-b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 114 and 136a-b, respectively, or in any practical combination thereof. The memory modules 116 and 134a-b may be realized as RAM memory, flash memory, ROM memory, EPROM memory, EEPROM memory, registers, a hard disk, a removable disk, a CD-ROM, or any other form of storage medium known in the art. In this regard, the memory modules 116 and 134a-b may be coupled to the processor modules 114 and 136a-b, respectively, such that the processors modules 114 and 136a-b can read information from, and write information to, memory modules 116 and 134a-b, respectively. The memory modules 116 and 134a-b may also be integrated into their respective processor modules 114 and 136a-b. In some embodiments, the memory modules 116 and 134a-b may each include a cache memory for storing temporary variables or other intermediate information during execution of instructions to be executed by processor modules 114 and 136a-b, respectively. Memory modules 116 and 134a-b may also each include non-volatile memory for storing instructions to be executed by the processor modules 114 and 136a-b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

In some embodiments, each of the UEs 104a-b can operate in a hybrid communication network in which the UE communicates with the BS 102, and with other UEs, e.g., between 104a and 104b. As described in further detail below, the UEs 104a-b support sidelink communications with other UE's as well as downlink/uplink communications between the BS 102 and the UEs 104a-b. In general, the sidelink communication allows the UEs 104a-b to establish a direct communication link with each other, or with other UEs from different cells, without requiring the BS 102 to relay data between UEs.

Embodiments Enabling Feedback During Sidelink
Communication

The configuration of resource pools to support feedback
during sidelink communication, and feedback channel trans-
mission and reception according to the present disclosure
will now be explained with reference to the following two
main embodiments. Both embodiments support a configu-
ration or a pre-configuration of one or more resource pools
for sidelink communication. The configuration refers to
scheduling performed by a base station, or a central node.
The BS (for example, 102) then sends a configuration
message to a UE (for example, UE 104*a*), which includes
configuration information of the one or more resource pools.
The term pre-configuration generally refers to when the UE
is out of coverage of the base station, in the case where the
configuration message sent by the base station cannot be
obtained, the pre-configuration information is used.

Embodiment #1

In a first embodiment of the present disclosure, support is
provided for configuring one or more resource pools to
include resources for a feedback channel. The embodiment
supports a first list of resource pools (transmitter/initiator
resource pool list) that is configured on a carrier or a
bandwidth part (BWP), and the first list includes at least one
resource pool. A second list of resource pools (receiver/
responder resource pool list) is also configured that includes
at least one resource pool.

Figure 2:
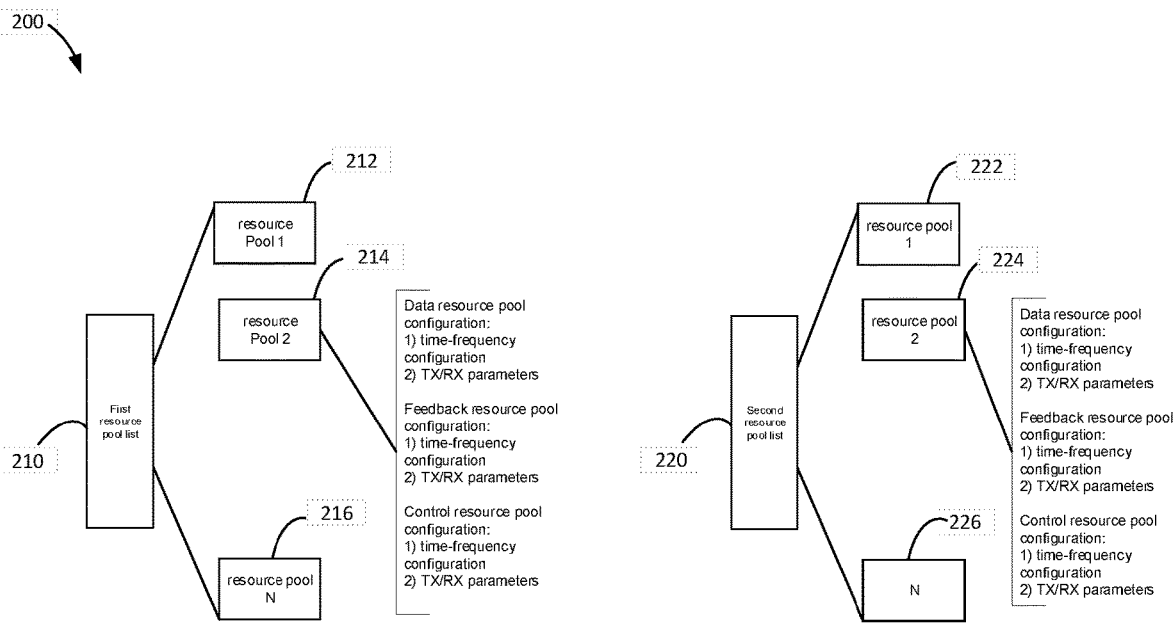
FIG. 2 illustrates an example allocation of first and second resource pool lists, according to an example embodiment of the present disclosure.

Referring now to FIG. 2, an example implementation of
the first embodiment is depicted, which shows a first list 210
of resource pools, and a second list 220 of resource pools.
The first list 210 and the second list 220 include at least one
resource pool, which refers to configuration information that
includes at least one resource pool in both the first list 210,
and the second list 220. The resource pools in the first list
210 and the second list 220 are defined separately.

If a resource pool belongs to the first list 210, then the
rules that apply to such resource pools (for example, 212,
214, and 216) are as follows:

If a first type of resources or a data resource pool is
defined/included in the resource pool in the configura-
tion message (from BS to UE), then the data resource
pool or the first type of resources are candidate
resources that are used for data transmission by the UE.

If a second type of resources or a control resource pool is
defined/included in the resource pool in the configura-
tion message (from BS to UE), then the control
resource pool or the second type of resources are
candidate resources that are used by the UE to perform
control information transmission.

If a third type of resources or a feedback resource pool is
defined/included in the resource pool in the configura-
tion message (from BS to UE), then the feedback
resource pool or the third type of resources are candi-
date resources that are used for receiving feedback
information by the UE. It is seen that the resource pool
in the first list 210 is a resource pool for a data sender
(in other words, it is a data sending resource pool).
Referring back to FIG. 2, the above rules apply to
resource pool 1 (212), and resource pool 2 (214), and
resource pool N (216).

In contrast to the first list 210, if a resource pool belongs
to the second list 220, then the rules that apply to such
resource pools (for example, 222, 224, and 226) are as
follows:

If a first type of resources or a data resource pool is
defined/included in the resource pool in the configura-
tion message (from BS to UE), then the data resource
pool or the first type of resources are resources that are
used for receiving data by the UE.

If a second type of resources or a control resource pool is
defined/included in the resource pool in the configura-
tion message (from BS to UE), then the control
resource pool or the second type of resources are
resources that are used for receiving control informa-
tion by the UE.

If a third type of resources or a feedback resource pool is
defined/included in the resource pool in the configura-
tion message (from BS to UE), then the then the
feedback resource pool or the third type of resources
are candidate resources that is used by the UE to
transmit feedback information. It is seen that the
resource pool in the second list 220 is a resource pool
for a data receiver (in other words, it is a data receiving
resource pool). Referring back to FIG. 2, the above
rules apply to resource pools belonging to the second
list, for example, resource pools 222, 224, and 226.

The above-mentioned configuration of one or more
resource pools includes at least one of the following infor-
mation: time-frequency domain resource configuration
information of the data resource (pool), time-frequency
domain resource configuration information of the feedback
resource (pool), and time-frequency domain configuration
information of the control resource (pool).

In some example of the first embodiment, the feedback
functionality is configured to be enabled or disabled. If
enabled, the feedback resource/channel transmission and
reception attributes are supported. If not, the configured
feedback resource/channel is unavailable to send or receive
feedback information.

Figure 3:
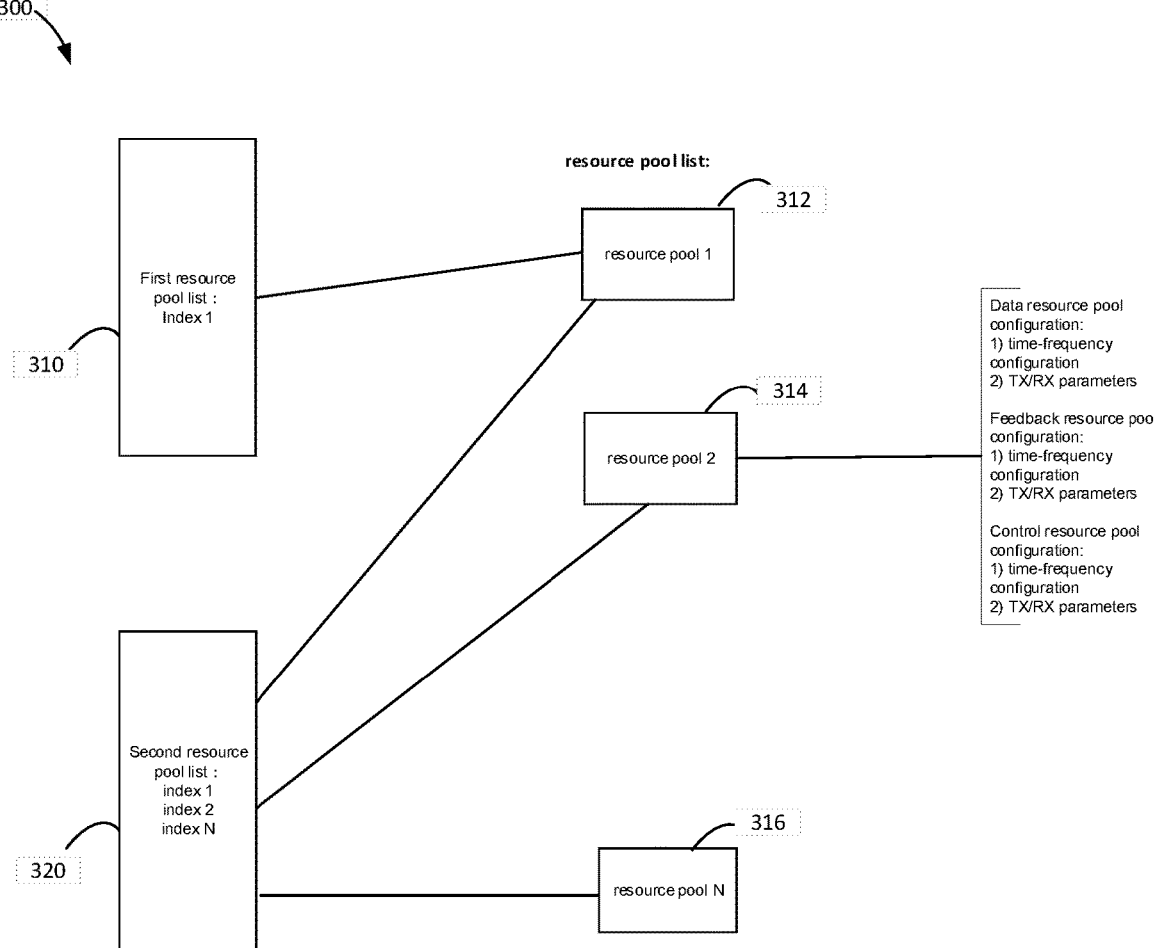
FIG. 3 illustrates an example allocation of first and second resource pool lists, according to yet another example embodiment of the present disclosure.

Referring now to FIG. 3, yet another example of the first
embodiment is shown. In this example, the first list 310 and
the second list 320 include at least one resource pool in
common. The common resource pool refers to a sequence
number or an index number for at least one resource pool
that is included in both the first list 310 and the second list
320. In FIG. 3, resource pool 312 is shown as a common
resource pool for both the first list 310, and the second list
320. When the first list 310 and the second list 320 contain
a common resource pool, then in some example of the first
embodiment, the configuration information only includes
the index of the common resource pool. In the example
implementation depicted in FIG. 3, also shown are resource
pools that belong to only the second list 320, for example,
resource pools 314 and 316.

In some example of the first embodiment, the common
resource pool configuration further includes: configuring a
data resource and a corresponding feedback resource with a
minimum time domain interval of K slots. The interval K
time slots refers to one of the following: the minimum time
domain interval is K physical time slots, or the minimum
interval is K candidate time slots, or the minimum interval
is K time slots which are included in a resource pool. In one
example implementation, K is configured on a per resource
pool basis.

In some example of the first embodiment, the resource
pool configuration further includes: configuring a time
domain period of the feedback resource to be N slots, which
is indicative of the feedback resource being present every N
slots. The N times slots is defined as one of the following:
the period is N physical time slots, or a period of N logical
slots. In some example of the first embodiment, the logical slots are either SL candidate time slots, or a period of N time slots which belong to a resource pool. In one example implementation, N is configured on a per resource pool basis.

In the above examples of the first embodiment, the physical time slot refers to a time slot obtained by dividing the physical time. For example, in a 3GPP system, one radio frame cycle includes 1024 radio frames, each radio frame is 10 milliseconds, and the radio frame is further divided into 10 subframes. One subframe is 1 millisecond, and one subframe contains K slots, where K is the ratio of the currently used subcarrier spacing to the reference subcarrier spacing (15 KHz). The candidate time slots are a subset of the above physical time slots. For example, some physical time slots cannot be used by sidelink, and excluding these time slots which cannot be used by sidelink, and the remaining time slots are candidate time slots for sidelink communication. The time slots included in a resource pool are a subset of the above candidate time slots, are also a subset of the above physical time slots. Only a part of the candidate time slots are included in the resource pool. In one example implementation of the first embodiment, a radio frame has 40 physical slots, and wherein the first 20 slots [1,20] are used for DL communication or reserved for communications other than SL. In the example implementation, the candidate slots for SL are the remaining 20 slots [21,40], and a SL resource pool slots is a subset of [21,40], e.g., a resource pool could just include the even slots [22:2:40].

Embodiment #2

Figure 4:
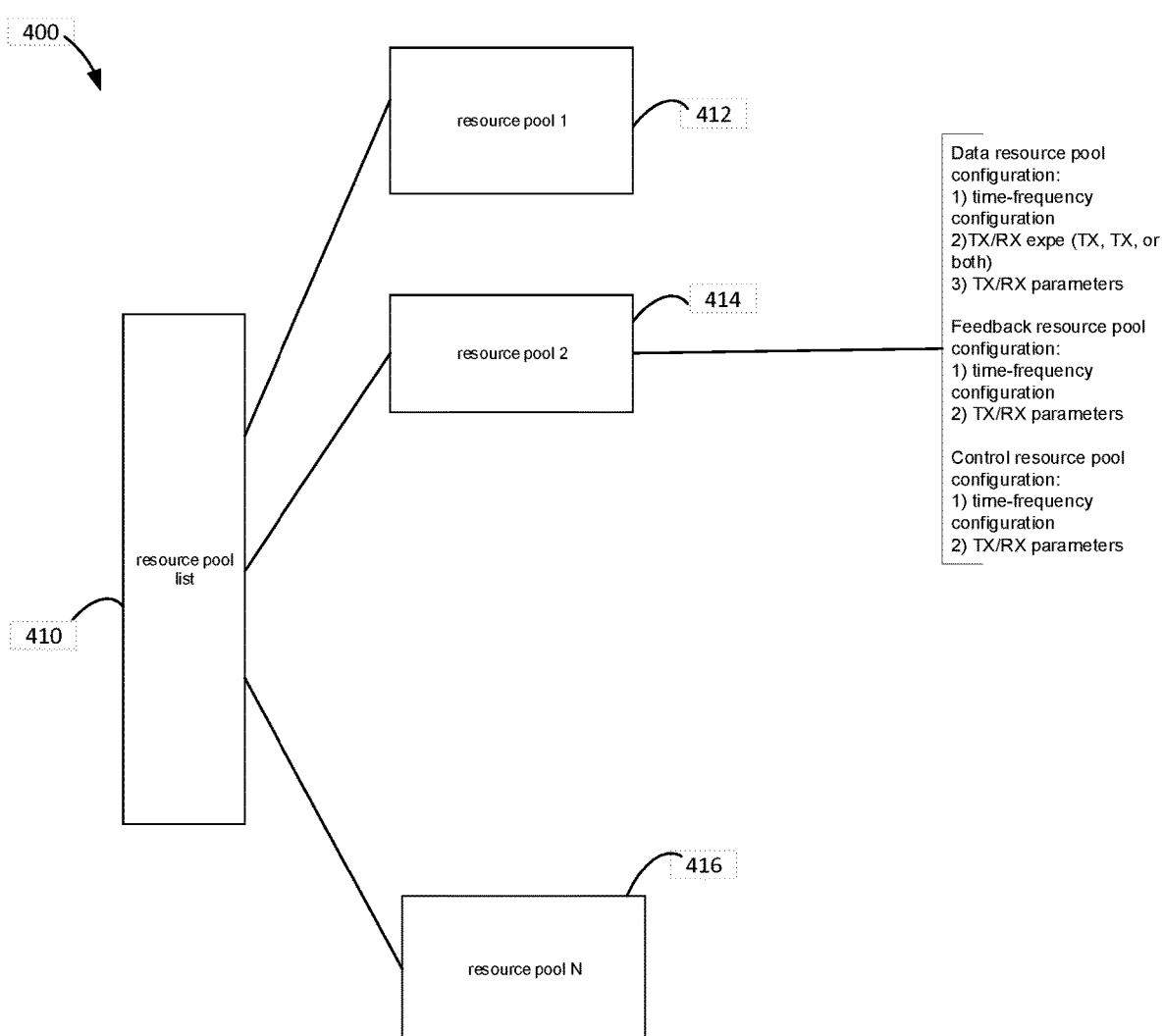
FIG. 4 depicts a resource pool allocation to support sidelink communication, according to an example embodiment of the present disclosure.

Referring now to FIG. 4, a second embodiment for configuring one or more resource pools is depicted, with a resource pool list being configured (or pre-configured) on one carrier or BWP, with the list including at least one resource pool (which does not distinguish between sending/receiving resource pools, unlike embodiment #1 described above). In the example implementation depicted in FIG. 4, there is only one list of resource pools 410. For each of the resource pools, for example, resource pools 412, 414, and 416 in FIG. 4, the resource pool is configured with at least one of the following information: data resource (pool) and data resource (pool) transceiver attributes, feedback resource (pool) and feedback resource (pool) transceiver attributes, control resource (pool) and control resource (pool) transceiver attributes. The transceiver attributes indicate that the corresponding resource/channel is used for transmitting, receiving, or both transmitting and receiving.

In some example of the second embodiment, the transceiver attributes of one or more resources (pools) may be independently indicated. In one example, the transceiver attribute of the feedback resource (pool) does not need to be explicitly configured, since it is composed of the transceiver attributes of the data resource (pool). The transmitting and receiving attributes are determined implicitly. Specifically, when the attribute of the data resource is indicated as supporting "transmit", then attribute of the corresponding feedback resource is to "receive." When the attribute of the data resource is to "receive," the corresponding feedback resource supports "transmit." When the transceiver attribute of the data resource indicates both "transmit and receive," then the attributes of the corresponding feedback resource are "receive and transmit." Similarly, the attribute of the control resource can also be implicitly determined from the transceiver attributes of the data resource, being the same as the transceiver attributes of the corresponding data resource.

In some example of the second embodiment, the feedback functionality is configured to be enabled or disabled. If enabled, the feedback resource (pool) is configured to send and receive feedback information. If not, the configured feedback resource (pool) cannot be used to send feedback information.

In some example of the second embodiment, the configuration of one or more resource pools further includes: configuring a data resource and a corresponding feedback resource with a minimum time domain interval of K slots. The interval K time slots refers to one of the following: the minimum time domain interval is K physical time slots, or the minimum interval is K candidate time slots, or the minimum interval is K time slots which are included in a resource pool. In one example implementation, K is configured on a per resource pool basis.

In some example of the second embodiment, the configuration of one or more resource pools further includes: configuring a time domain period of the feedback resource to be N slots, which is indicative of the feedback resource being present every N slots. The period of the N times slots is defined as one of the following: the period is N physical time slots, or a period of N candidate time slots, or a period of N time slots included in a resource pool. In one example implementation, N is configured on a per resource pool basis.

In all the above examples of the second embodiment, the physical time slot refers to a time slot obtained by dividing the physical time. For example, in a 3GPP system, one radio frame cycle includes 1024 radio frames, each radio frame is 10 milliseconds, and the radio frame is further divided into 10 subframes. One subframe is 1 millisecond, and one subframe contains slots, where is the ratio of the currently used subcarrier spacing to the reference subcarrier spacing (15 KHz). The candidate time slots are a subset of the above physical time slots. For example, some physical time slots cannot be used by sidelink, and these time slots are not alternative time slots for sidelink communication.

The time slot included in a resource pool belonging to the one or more resource pools means that in a physical time slot or a candidate time slot, only a part of the time slot is included in the resource pool, that is, the time slot included in the resource pool is a physical time slot or a candidate time slot.

Description Applicable to Both Embodiments

In the present disclosure, the control resource (pool) corresponds to a control channel (CCH, control channel), the feedback resource (pool) corresponds to a feedback channel (FCH, feedback channel), and the data resource (pool) corresponds to a data channel (SCH, Sharing channel). The resource configuration applies to a data sender that sends data on a data resource on a configured or pre-configured resource pool, and receives feedback information in the feedback resource.

In some example embodiment, if a UE (e.g., UE 104*a*) needs to perform data transmission, the configuration information for the UE includes: receiving or acquiring configuration or pre-configuration information including at least one resource pool, acquiring a transmission grant of the data transmission on the one resource pool, and transmitting data corresponding to the grant. The UE then sends data using a data resource configured on the one resource pool, and receives feedback information on a feedback resource corresponding to the data resource, where the feedback resource is configured on the one resource pool.

In some embodiments, the transmission grant includes at least one data resource on one or more resource pools for transmitting data, and the obtaining the transmission grant of the data transmission includes acquiring, from the base station or the scheduling node, scheduling information including a transmission grant on the at least one resource pool. The scheduling information includes at least one data resource corresponding to the transmission grant, or the UE independently selects at least one data resource as the data resource corresponding to the transmission grant on the at least one resource pool.

In some embodiments, a data resource on a resource pool has a one-to-one correspondence with a corresponding feedback resource on a resource pool, for example, a time domain correspondence. In some embodiments, if the last symbol of the data resource is located in the time slot n, the feedback resource corresponding to the data resource is located in the time slot n+a. The value of "a" is greater than or equal to the minimum time interval K, which is configured or pre-configured, between the data resource in the resource pool and its corresponding feedback resource. A feedback resource is configured on time slot n+a. In some embodiments, the feedback resource is within the frequency range of its corresponding data resource.

In some embodiments, a data receiver is structured to receive data on one or more data resource pools that are configured or pre-configured, and is structured to send feedback using the configured or pre-configured feedback resources. In some embodiments, the configuration information for a UE (e.g., UE 104a) to receive data includes: receiving or acquiring configuration or pre-configuration information including at least one resource pool, and receiving data on a data resource of each resource pool on the at least one resource pool.

In some embodiments of the present disclosure, it is not necessary to obtain transmission grant before a UE sends feedback, since the feedback resource used for sending the feedback is determined according to the data resource of the received data transmission. In an example embodiment, a data resource on a resource pool has a one-to-one correspondence with a corresponding feedback resource, for example, a time domain correspondence. If the last symbol of the data resource is located in the time slot n, the corresponding feedback of the data resource is located in the slot n+a. The value of "a" is greater than or equal to the minimum time interval K of the data resource configured or pre-configured on the resource pool and its corresponding feedback resource. In some embodiments, the feedback resource is within the frequency range of its corresponding data resource.

In some embodiments, after determining the feedback resource corresponding to the data resource, the receiving UE may provide feedback about the data received on the data resource, including: if the data and its corresponding control information are received correctly, a positive feedback, such as an ACK, is sent on the corresponding feedback resource. If the data is received incorrectly, and the control information corresponding to the data is received correctly, a negative feedback, such as a NACK, is sent in the corresponding feedback resource. In some embodiments, if the data and its corresponding control information are received correctly, no feedback is sent. In some embodiments, if the data is received incorrectly, and the control information corresponding to the data is received correctly, a negative feedback, such as NACK, is sent in the corresponding feedback resource. In some embodiments, if the data and its corresponding control information are received correctly, no feedback is sent. In some embodiments, if the data is received incorrectly, the control information corresponding to the data is received correctly, and the distance between the receiving UE and the transmitting UE is less than a threshold distance, then a negative feedback, such as NACK, is sent in the corresponding feedback resource.

Referring now to FIG. 5, a method 500 is depicted from the point of view of a wireless communication node (e.g., BS 102). The method describes the configuration of one or more resource pools performed by the wireless node to enable for sideline communication to occur that support feedback information.

At step 502, a plurality of resource pools are configured for sidelink communications by wireless communication node. The configured one or more resource pools are structured to support sending or receiving three different types of information: data, control information, or feedback information.

At step 504, the wireless node further configures a first list and a second list of resource pools. Each of the first and the second list includes at least one of: a first type of resources that are each configured for a plurality of wireless communication devices to communicate control information in the sidelink communications, or a second type of resources that are each configured for the plurality of wireless communication devices to communicate data in the sidelink communications, or a third type of resources that are each configured for the plurality of wireless communication devices to communicate feedback in the sidelink communications.

Referring now to FIG. 6, a method 600 is depicted from the point of view of a wireless communication device (e.g., UE 104a). The method describes the configuration of one or more resource pools necessary for sideline communication to occur that support feedback information that occurs at a UE.

At step 602, a plurality of resource pools that are configured for sidelink communications is received by a wireless communication device. In some embodiment, the device receiving the configuration is UE 104a. The received configuration of resource pools are structured to support sending or receiving three different types of information: data, control information, or feedback information.

At step 604, the wireless device further receives a configuration of one or more resource pools including a first list and a second list of resource pools. Each of the first and the second list includes at least one of: a first type of resources that are each configured for a plurality of wireless communication devices to communicate control information in the sidelink communications, or a second type of resources that are each configured for the plurality of wireless communication devices to communicate data in the sidelink communications, or a third type of resources that are each configured for the plurality of wireless communication devices to communicate feedback in the sidelink communications.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the disclosure is not restricted to the illustrated example architectures or configurations, but is implemented using a variety of alternative architectures and configurations. Additionally, as would be understood by persons of ordinary skill in the art, one or more features of one embodiment is combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations is used herein as a convenient means of distinguishing between two or more elements or instances of an element. Thus, a reference to first and second elements does not mean that only two elements is employed, or that the first element must precede the second element in some manner.

Additionally, a person having ordinary skill in the art would understand that information and signals is represented using any of a variety of different technologies and techniques. For example, data, instructions, commands, information, signals, bits and symbols, for example, which may be referenced in the above description is represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein is implemented by electronic hardware (e.g., a digital implementation, an analog implementation, or a combination of the two), firmware, various forms of program or design code incorporating instructions (which is referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein is implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor is a microprocessor, but in the alternative, the processor is any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions is stored as one or more instructions or code on a computer-readable medium. Thus, the steps of a method or algorithm disclosed herein is implemented as software stored on a computer-readable medium. Computer-readable media includes both computer storage media and communication media including any medium that is enabled to transfer a computer program or code from one place to another. A storage media is any available media that is accessed by a computer. By way of example, and not limitation, such computer-readable media can include RAM, ROM, EEPROM, CD-ROM or other optical disk storage, magnetic disk storage or other magnetic storage devices, or any other medium that is used to store desired program code in the form of instructions or data structures and that is accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein is applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device, configurations of a plurality of resource pools for sidelink communications;
wherein the configurations of the plurality of resource pools comprise a first list indicating a first subset of the plurality of resource pools and a second list indicating a second subset of the plurality of resource pools;
wherein a resource pool of the first subset of the plurality of resource pools includes: resources of a first type that are each configured for a wireless communication device to transmit control information in the sidelink communications; resources of a second type that are each configured for the wireless communication device to transmit data in the sidelink communications; and resources of a third type that are each configured for the wireless communication device to receive feedback in the sidelink communications, wherein the resources of the third type have a time-domain correspondence with the resources of the second type in the resource pool of the first subset of the plurality of resource pools, wherein a resource pool of the second subset of the plurality of resource pools includes: resources of a first type that are each configured for the wireless communication device to receive control information in the sidelink communications; resources of a second type that are each configured for the wireless communication device to receive data in the sidelink communications; and resources of a third type that are each configured for the wireless communication device to transmit feedback in the sidelink communications, wherein the resources of the third type has a time-domain correspondence with the resources of the second type in the resource pool of the second subset of the plurality of resource pools;

determining, by the wireless communication device, for each of the resource pool of the first subset and the resource pool of the second subset, respectively, a time interval between the resources of the second type and the resources of the third type to be A time slots, wherein A is equal to or bigger than a minimum time interval M time slots; and calculating, by the wireless communication device, the A time slots based on respective slots that are identified as belonging to the resource pool of the first subset and the resource pool of the second subset, respectively.

2. The wireless communication method of claim 1, wherein each of the first subset of resource pools indicated in the first list is configured for the wireless communication device to perform at least one of: transmitting the control information, transmitting the data, or receiving the feedback, and wherein each of the second subset of resource pools indicated in the second list is configured for the wireless communication device to perform at least one of: receiving the control information, receiving the data, or transmitting the feedback.

3. The wireless communication method of claim 1, further comprising:

transmitting, by the wireless communication device, a control information on the resources of the first type on the resource pool of the first subset of the plurality of resource pools and a data information on the resources of the second type on the resource pool of the first subset of the plurality of resource pools; and receiving, by the wireless communication device, with respect to the resource pool of the first subset of the plurality of resource pools, a feedback information on the resources of the third type which are associated with the resources of the second type.

4. The wireless communication method of claim 3, further comprising:

determining, by the wireless communication device, for each of the resource pool of the first subset and the resource pool of the second subset, a respective frequency bandwidth of the resources of the third type to be within a corresponding bandwidth of the resources of the second type.

5. The wireless communication method of claim 1, wherein the feedback is configured to be enabled, for each of the resource pool of the first subset and the resource pool of the second subset, in response to the resources of the third type being available, or to be disabled in response to the resources of the third type being unavailable.

6. The wireless communication method of claim 1, wherein each of the resource pool of the first subset and the resource pool of the second subset comprises a periodicity of N slots for the resources of the third type, wherein N is configured on a per resource pool basis, and wherein the N slots are calculated based on a slot that is identified as belonging to a respective resource pool.

7. The wireless communication method of claim 1, further comprising:

determining candidate time slots for sidelink communication as a subset of physical time slots;

determining first time slots identified as belonging to the resource pool of the first subset as a first subset of the candidate time slots; and determining second time slots identified as belonging to the resource pool of the second subset as a second subset of the candidate time slots.

8. A wireless communication method, comprising:

sending, by a wireless communication node, configurations of a plurality of resource pools for sidelink communications;

wherein the configurations of the plurality of resource pools comprise a first list indicating a first subset of the plurality of resource pools and a second list indicating a second subset of the plurality of resource pools;

wherein a resource pool of the first subset of the plurality of resource pools includes: resources of a first type that are each configured for a wireless communication device to transmit control information in the sidelink communications; resources of a second type that are each configured for the wireless communication device to transmit data in the sidelink communications; and resources of a third type that are each configured for the wireless communication device to receive feedback in the sidelink communications, wherein the resources of the third type have a time-domain correspondence with the resources of the second type in the resource pool of the first subset of the plurality of resource pools, wherein a resource pool of the second subset of the plurality of resource pools includes: resources of a first type that are each configured for the wireless communication device to receive control information in the sidelink communications; resources of a second type that are each configured for the wireless communication device to receive data in the sidelink communications; and resources of a third type that are each configured for the wireless communication device to transmit feedback in the sidelink communications, wherein the resources of the third type has a time-domain correspondence with the resources of the second type in the resource pool of the second subset of the plurality of resource pools, wherein the wireless communication device determines, for each of the resource pool of the first subset and the resource pool of the second subset, respectively, a time interval between the resources of the second type and the resources of the third type to be A time slots, wherein A is equal to or bigger than a minimum time interval M time slots, wherein the wireless communication device calculates the A time slots based on respective slots that are identified as belonging to the resource pool of the first subset and the resource pool of the second subset, respectively.

9. The wireless communication method of claim 8, wherein each of the first subset of resource pools indicated in the first list is configured for the wireless communication device to perform at least one of: transmitting the control information, transmitting the data, or receiving the feedback, and wherein each of the second subset of resource pools indicated in the second list is configured for the wireless communication device to perform at least one: receiving the control information, receiving the data, or transmitting the feedback.

10. The wireless communication method of claim 8, wherein the feedback is configured to be enabled, for each of the resource pool of the first subset and the resource pool of the second subset, in response to the resources of the third type being available, or to be disabled in response to the resources of the third type being unavailable.

11. The wireless communication method of claim 8, wherein each of the resource pool of the first subset and the resource pool of the second subset comprises a periodicity of N slots for the resources of the third type, wherein Nis configured on a per resource pool basis, and wherein the N slots are calculated based on a slot that is identified as belonging to a respective resource pool.

12. A communication apparatus comprising a processor configured to:

receive configurations of a plurality of resource pools for sidelink communications;

wherein the configurations of the plurality of resource pools comprise a first list indicating a first subset of the plurality of resource pools and a second list indicating a second subset of the plurality of resource pools;

wherein a resource pool of the first subset of the plurality of resource pools includes: resources of a first type that are each configured for a wireless communication device to transmit control information in the sidelink communications; resources of a second type that are each configured for the wireless communication device to transmit data in the sidelink communications; and resources of a third type that are each configured for the wireless communication device to receive feedback in the sidelink communications, wherein the resources of the third type have a time-domain correspondence with the resources of the second type in the resource pool of the first subset of the plurality of resource pools, wherein a resource pool of the second subset of the plurality of resource pools includes: resources of a first type that are each configured for the wireless communication device to receive control information in the sidelink communications; resources of a second type that are each configured for the wireless communication device to receive data in the sidelink communications; and resources of a third type that are each configured for the wireless communication device to transmit feedback in the sidelink communications, wherein the resources of the third type has a time-domain correspondence with the resources of the second type in the resource pool of the second subset of the plurality of resource pools;

determine, for each of the resource pool of the first subset and the resource pool of the second subset, respectively, a time interval between the resources of the second type and the resources of the third type to be A time slots, wherein A is equal to or bigger than a minimum time interval M time slots; and calculate the A time slots based on respective slots that are identified as belonging to the resource pool of the first subset and the resource pool of the second subset, respectively.

13. The communication apparatus of claim 12, wherein each of the first subset of resource pools indicated in the first list is configured for the wireless communication device to perform at least one of: transmitting the control information, transmitting the data, or receiving the feedback, and wherein each of the second subset of resource pools indicated in the second list is configured for the wireless communication device to perform at least one of: receiving the control information, receiving the data, or transmitting the feedback.

14. The communication apparatus of claim 12, wherein the feedback is configured to be enabled, for each of the resource pool of the first subset and the resource pool of the second subset, in response to the resources of the third type being available, or to be disabled in response to the resources of the third type being unavailable.

15. The communication apparatus of claim 12, wherein each of the resource pool of the first subset and the resource pool of the second subset comprises a periodicity of N slots for the resources of the third type, wherein N is configured on a per resource pool basis, and wherein the N slots are calculated based on a slot that is identified as belonging to a respective resource pool.

16. A communication apparatus comprising a processor configured to:

send configurations of a plurality of resource pools for sidelink communications;

wherein the configurations of the plurality of resource pools comprise a first list indicating a first subset of the plurality of resource pools and a second list indicating a second subset of the plurality of resource pools;

wherein a resource pool of the first subset of the plurality of resource pools includes: resources of a first type that are each configured for a wireless communication device to transmit control information in the sidelink communications; resources of a second type that are each configured for the wireless communication device to transmit data in the sidelink communications; and resources of a third type that are each configured for the wireless communication device to receive feedback in the sidelink communications, wherein the resources of the third type have a time-domain correspondence with the resources of the second type in the resource pool of the first subset of the plurality of resource pools, wherein a resource pool of the second subset of the plurality of resource pools includes: resources of a first type that are each configured for the wireless communication device to receive control information in the sidelink communications; resources of a second type that are each configured for the wireless communication device to receive data in the sidelink communications; and resources of a third type that are each configured for the wireless communication device to transmit feedback in the sidelink communications, wherein the resources of the third type has a time-domain correspondence with the resources of the second type in the resource pool of the second subset of the plurality of resource pools, wherein the wireless communication device determines, for each of the resource pool of the first subset and the resource pool of the second subset, respectively, a time interval between the resources of the second type and the resources of the third type to be A time slots, wherein A is equal to or bigger than a minimum time interval M time slots, wherein the wireless communication device calculates the A time slots based on respective slots that are identified as belonging to the resource pool of the first subset and the resource pool of the second subset, respectively.

17. The communication apparatus of claim 16, wherein each of the first subset of resource pools indicated in the first list is configured for the wireless communication device to perform at least one of: transmitting the control information, transmitting the data, or receiving the feedback, and wherein each of the second subset of resource pools indicated in the second list is configured for the wireless communication device to perform at least one: receiving the control information, receiving the data, or transmitting the feedback.

\* \* \* \* \*